May 22, 1956  M. R. JONES  2,746,781
WIPING AND SEALING DEVICES FOR WELL PIPES
Filed Jan. 26, 1952  2 Sheets-Sheet 1
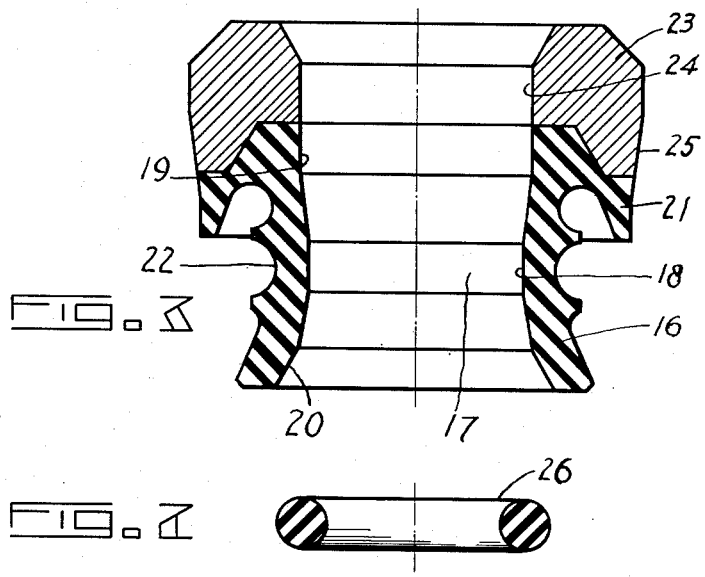
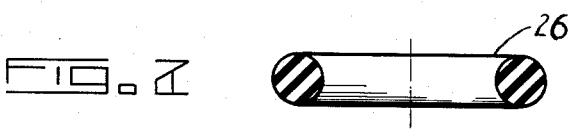
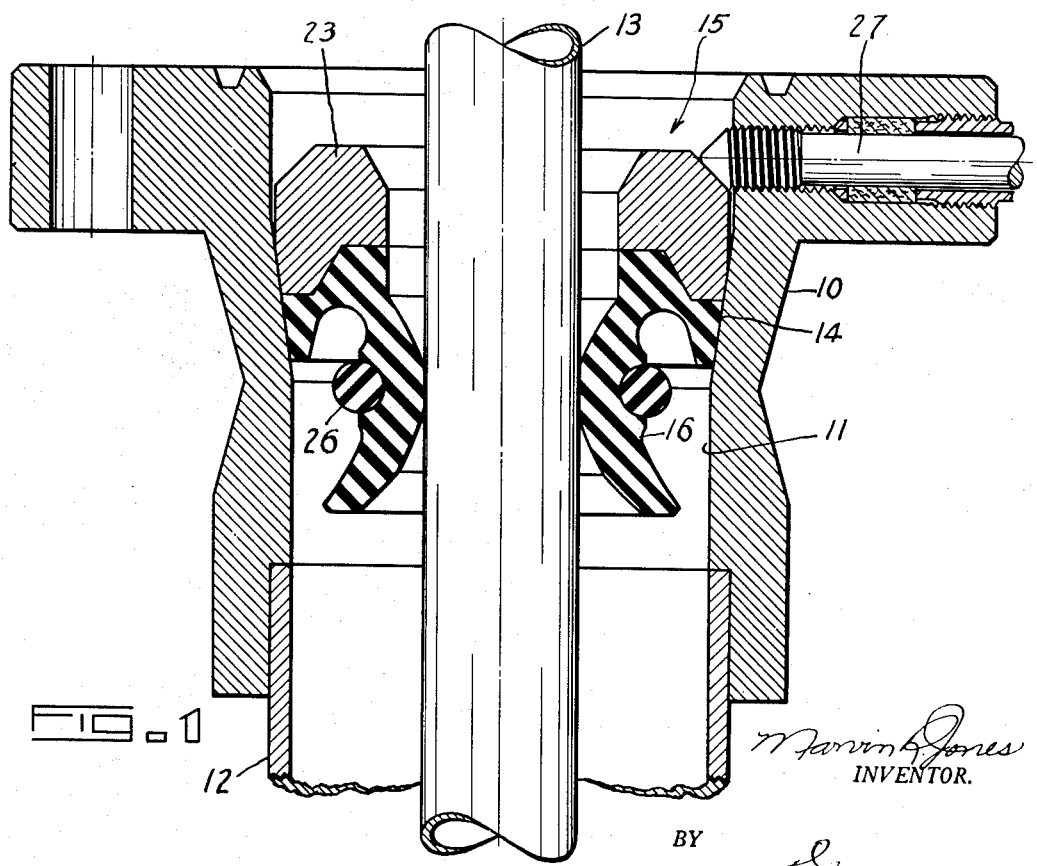
Marvin R. Jones
INVENTOR.
BY
ATTORNEY

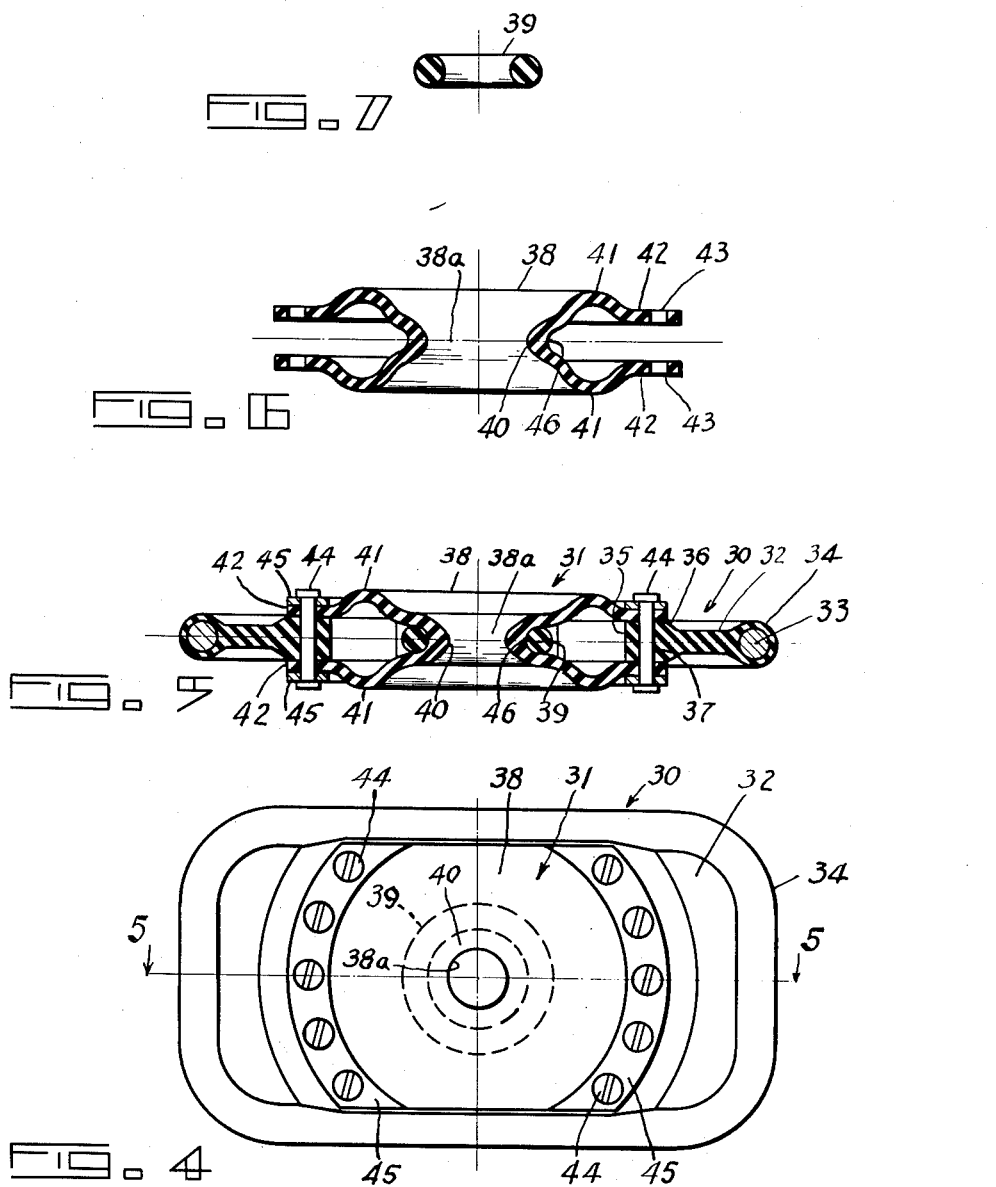

United States Patent Office 2,746,781
Patented May 22, 1956

2,746,781

WIPING AND SEALING DEVICES FOR WELL PIPES

Marvin R. Jones, Houston, Tex., assignor to Petroleum Mechanical Development Corporation, Houston, Tex., a corporation of Texas Application January 26, 1952, Serial No. 268,376

12 Claims. (Cl. 288—2)

This invention relates to devices employed in connection with well drilling or production operations, which devices include a resilient element adapted to circumferentially engage the surface of a pipe for the purpose of wiping oil, drill mud or other deposits from the pipe surface as it is drawn through the resilient engaging element, or to form a resilient seal for the annular space between the pipe and a larger concentric pipe or well head opening and the like, or to form such a seal while simultaneously wiping the inner pipe as it is drawn through the resilient element.

Conventional devices of the character described normally include a pipe-engaging element in the form of a body composed of flexible resilient material having a bore or opening adapted to surround and engage the pipe. Such body may be generally tubular, relatively flat or of other suitable shape for the use intended. In such conventional devices, the bore or opening will be cut, molded, or otherwise suitably preformed to have a nominal diameter slightly less than the external diameter of the pipe to be extended therethrough in order to assure sealing or wiping engagement with the pipe surface. This conventional construction has the important disadvantage that when the pipe is inserted through the bore or opening of the resilient body element, the resilient material in engagement with the pipe surface will necessarily be stretched radially and circumferentially and will, therefore, be placed in circumferential tension, the magnitude of which will be dependent upon the extent of the stretching to which the material is subjected. This tension will be substantially at right angles to the line of movement of the pipe with respect to the resilient material forming the wall of the bore or opening in engagement with the pipe surface. It is a characteristic of the conventional resilient materials, such as natural or artificial rubbers commonly employed in such devices, that when under tensional stress of the type described, they will be very easily cut, abraded or worn by roughness or slight projections on the surfaces of the pipe being drawn therethrough in the direction generally normal to the direction of the tensional stress. As a result, conventional devices will quickly become cut, worn and inefficient in the performance of their sealing and wiping functions and must be frequently replaced with attendant cost for new devices and labor.

To obviate the described disadvantages of more conventional devices, the present invention contemplates an improved construction wherein the resilient pipe-engaging element is composed of two portions which may be designated as an inner pipe-engaging member and an outer constricting member, both of which are constructed of conventional flexible resilient materials, such as natural or artificial rubbers. The inner member, which is adapted to directly engage the pipe surface, comprises a body which may have a generally tubular or toroidal form having a bore or opening for receiving the pipe. The bore or opening will be cut, molded or otherwise suitably preformed to have a nominal diameter which is slightly larger than the external diameter of the pipe to be received thereby. The outer member comprises a continuous ring-shaped element, the body of which is preferably circular in cross section and which is adapted to surround the exterior of the inner member. The inner diameter of the outer member is made somewhat less than the external diameter of the inner member so that the outer member must be stretched radially and circumferentially in order to install it about the exterior of the inner member. When so installed, the resilient ring will constrict the inner member uniformly throughout its circumference and will thereby cause the inner wall forming the bore of the inner member to constrict circumferentially inwardly, thereby reducing the internal diameter of the bore of the inner member sufficiently to tightly engage a pipe inserted therein. The inwardly directed pressure thus applied by the outer member to the exterior of the inner member will place the material composing the wall of the inner member in compression against the pipe surface, and thereby produce the desired sealing or wiping action. By thus placing the pipe-engaging member in compression, rather than in tension as in more conventional devices, above noted, the pipe-engaging inner member will become highly resistant to cutting or abrading action by projections or irregularities on the pipe surface and will give much longer and more efficient service than existing devices, which is a primary object of this invention.

Other and more specific objects and advantages of the present invention will become apparent from the following detailed description when read in conjunction with the accompanying drawings which illustrate several useful embodiments in accordance with this invention.

In the drawings:

Fig. 1 is a longitudinal sectional view of a generally conventional well head having a pipe extending through the bore thereof and showing one embodiment of the present invention embodied in a sealing device for sealing the annular space between the pipe and the well head and showing the device in constricted sealing position about the pipe;

Fig. 2 is a cross-sectional view of the outer ring-shaped constricting member of the sealing device of Fig. 1;

Fig. 3 is a longitudinal cross-sectional view of the inner pipe-engaging member of the sealing device of Fig. 1, showing this member in its pre-formed non-constricted condition;

Fig. 4 is a plan view of a pipe wiper structure including a wiping device constructed in accordance with another embodiment of this invention;

Fig. 5 is a transverse sectional view along line 5—5 of Fig. 4, showing the parts of the wiping device in their constricted pipe-engaging positions;

Fig. 6 is a cross-sectional view of the inner pipe-engaging member of the wiping device in its pre-formed non-constricted condition; and Fig. 7 is a cross-sectional view of the outer ring-shaped constricting member of the wiper device.

Reference will first be had to Figs. 1, 2 and 3, which illustrate one embodiment of this invention in a form adapted to seal the annular space between a well head and a pipe extending therethrough. In Fig. 1 there is shown a conventional generally tubular well head 10 having an axial bore 11 and connected at its lower end to the upper end of a well casing 12. A pipe 13 is shown extending through the bore of the well head. The latter is provided with the usual tapered internal shoulder or seat 14 adapted to support a sealing device, designated generally by the numeral 15, which embodies the features of the present invention and is designed to form a resilient seal for the annular space between pipe 13 and the bore wall of the well head.

Sealing device 15 is composed of the inner pipe-engaging member illustrated in Fig. 3 and the outer constricting member illustrated in Fig. 2, both these members being shown in their nominal pre-formed and non-stressed conditions.

The inner member comprises a generally tubular body 16 constructed of flexible resilient material, such as rubber, Neoprene or other artificial rubber-like material, and having an axial bore 17. In molding or forming body 16, bore 17 may be provided intermediate its ends with a relatively short axially straight portion 18 adjoined at each end by outwardly flaring upper and lower portions 19 and 20, respectively, of somewhat larger internal diameter than portion 18. Axially straight portion 18 will be initially formed to have, in its non-stressed condition, a diameter somewhat greater than the exterior of pipe 13. Integrally formed with the upper end portion 19 of body 16 is an outwardly extending, downwardly flaring, flexible marginal lip 21. The exterior of body 16 opposite straight portion 18 is provided with a circumferential recess 22, which is preferably semi-circular in cross section. The upper end of body 16 is bonded or otherwise suitably anchored to a metal support ring 23 having an axial bore 24 registering with the upper end of bore 17. The outer wall of support ring 23 is provided with a downwardly and inwardly tapering shoulder 25 which is flush with the peripheral portion of lip 21 and is dimensioned to lodge on seat 14 which thereby acts to support and limit the downward movement of sealing device 15 in the bore of well head 10.

The outer constricting member of sealing device 15 comprises a ring-shaped member 26 composed of flexible resilient material which will usually be the same material as that from which body 16 is constructed, but which may be a different material having, however, the desired flexible, resilient properties. The body of member 26 is preferably circular in cross-section, as shown. Member 26 will be molded or otherwise suitably fabricated to have an internal diameter, in its initial unstressed condition, which is somewhat smaller than the external diameter of that portion of body 16 on which it is to be mounted. In the embodiment illustrated, the internal diameter of member 26 will be somewhat smaller than the bottom of recess 22 in which member 26 is adapted to be seated. As a result of this dimensional relationship, member 26 must be stretched, or body 16 constricted, in order to place member 26 about the exterior of body 16 and to seat member 26 in recess 22. When so placed and freed of external restraint, ring member 26 will tend to return to its normal dimensions which movement will annularly constrict the portion of body 16 which it surrounds, for example, straight portion 18. It will be understood that ring member 26 will be constructed to have sufficient stretch-resisting strength to exceed the resistance to deformation and inward constriction of the portion of the wall of body 16 which is surrounded by the ring member. Thus, when ring member 26 is in place about body 16, the greater strength of ring member 26 will force body 16 to be circularly constricted to a diameter which will nominally be less than the external diameter of pipe 13.

With ring member 26 mounted about the exterior of body 16, as described, the device may be installed in bore 11 of the well head by placing the lower end of body 16 over the upper end of pipe 13, flaring portion 20 serving to guide the end of the pipe into bore 17 of the sealing device. The sealing device may then be forced downwardly over the exterior of the pipe, straight portion 18 expanding annularly by reason of its resilience sufficiently to accommodate the pipe. Expansion of body 16 by the intrusion of pipe 13 will be transmitted to ring member 26 and will act to create circumferential tension in ring member 26 which will, in turn, act to place an annular compressive force about body 16 and force the latter into compressive sealing engagement against pipe 13. Any pressure fluid present within the annular space between pipe 13 and well head 10 will act on the exterior of body 16 to intensify the compression thereof about pipe 13 and will also act to urge lip 21 outwardly into sealing contact with seat 14 of the well head thereby effectively sealing the annular space. A conventional hold-down screw 27 extends through the wall of well head 10 and projects into bore 11 adjacent the upper end of support ring 23 whereby to releasably lock sealing device 15 against upward movement in the well head after it has been landed on seat 14.

By thus placing the material composing the wall of body 16 in compression between pipe 13 and member 26, the latter will be rendered highly resistant to tearing or abrasion by roughness or irregularities on the surface of pipe 13 when the latter is drawn therethrough. At the same time any deposits of oil, mud, or other foreign matter will be effectively wiped from the pipe surface by the portion of body 16 which is in compressive engagement with the pipe surface.

Figs. 4 to 7, inclusive, illustrate a pipe wiper device which employs as a wiping element a structure embodying the primary features of this invention.

As shown in Figs. 4 and 5, the pipe wiper device comprises a supporting structure, designated generally by the numeral 30, and a wiper element, designated generally by the numeral 31. The supporting structure comprises a flat, oblong frame 32 constructed of a sheet of flexible resilient material or synthetic rubber, having a metal reinforcing rod 33 molded into the material about its outer periphery to form a relatively stiff bead 34 thereabout. An opening 35 is provided in the medial portion of frame 32 which is generally circular in shape, except for a slight flattening where the opening merges into opposite edges forming the narrower dimension of the frame. The edges of the frame adjacent opening 35 are thickened, as at 36, to strengthen these edges for attachment thereto of wiping element 31. The thickened edges 36 are provided with a plurality of angularly spaced bolt holes 37 extending therethrough parallel to the axis of opening 35.

Fig. 6 illustrates the inner pipe-engaging member 38, and Fig. 7 the outer ring member 39, which together comprise wiping element 31, both members being shown in their unstressed condition as originally molded. Inner member 38 is molded from flexible, resilient material, such as natural or synthetic rubber, into the hollow generally toroidal shape, as shown, having a central circular opening 38a. In molding or forming, inner member 38 is shaped to provide a narrow, rounded, annular pipe-engaging portion 40 projecting slightly inwardly from its inner periphery, the inner edge of portion 40 forming opening 38a. Pipe-engaging portion 40 merges at each side into rearwardly extending convex webs 41—41 which, in turn, merge into parallel flanges 42—42, the edges of which are flattened at two opposite sides for entry into the flattened portions of opening 35. Flanges 42 are adapted to receive between them thickened edges 36 of the frame and are provided with angularly spaced pairs of holes 43—43 which register with bolt holes 37 so that the wiping element may be releasably fastened to edges 36 of the frame by suitable means such as bolts 44 which extend through the several registering holes. Arcuate metal clamping plates 45—45 may be positioned on the outer faces of flanges 42—42 and bolts 44 extended therethrough to more effectively clamp the wiping element to the frame.

In molding or forming inner member 38 an annular semi-circular recess 46 is provided on the inner side of pipe-engaging portion 40 for the reception of outer constricting ring member 39, which is also constructed of flexible resilient material like outer member 26 of the previously described embodiment. As in the latter, central opening 38a will be formed to have nominal unstressed diameter somewhat greater than that of the pipe to be extended or drawn therethrough, and outer ring member 39 will be made to have an internal diameter somewhat less than the external diameter of the inner wall of inner member 38 at the bottom of recess 46; and the stretch-resisting strength of outer ring member 39 will be sufficient to exceed the resistance to deformation and inward constriction of pipe-engaging portion 40, so that when outer member 39 has been put in place about portion 40 the latter will be constricted sufficiently to reduce the diameter of opening 38a to less than that of the inserted pipe, the reduction in diameter being evident by comparison between Figs. 5 and 6.

The pipe wiper structure may be assembled by first placing outer member 39 in recess 46 about inner member 38 to form wiping element 31, which may then be mounted in supporting structure 30, by placing the wiping element in opening 35 and inserting thickened edges 36 between the pairs of flanges 43. Clamping plates 45 are then put in place on flanges 43 and bolts 44 extended through plates 45 and edges 36 by way of the registering holes in these elements to clamp the wiper element to the frame.

The structure is then placed over the upper end of a pipe (not shown) to be drawn therethrough. The flexibility of pipe-engaging portion 40 and outer member 39 will permit these members to expand under the thrust of the pipe to expand opening 38a sufficiently to accommodate the pipe. Webs 41 will also flex to absorb the contraction and expansion in member 38. As in the previously described embodiment, the resulting tensional forces will be largely concentrated in outer ring member 39 while pipe-engaging portion 40 will be in compression and, therefore, more highly resistant to abrasion or tearing by the pipe as it is drawn through opening 38a. The compressive engagement of portion 40 with the pipe surface will, of course, wipe any deposits from the surface of the pipe as the latter is drawn through the wiper element. It will be understood that the wiper structure will normally be restrained against upward movement with the pipe by any suitable and conventional means, as by installing the wiper structure beneath and in engagement with the edges of a rotary table opening through which the pipe is drawn.

For the purposes of this description, inner pipe-engaging members 16 and 38 may be generally characterized as annular bodies, it being understood that this term embraces relatively elongated tubular shapes, as well as the relatively short toroidal forms herein described and other forms differing somewhat in other details of construction.

It will be understood that numerous changes and alterations may be made in the details of the described embodiments within the scope of the appended claims but without departing from the spirit of this invention.

What I claim and desire to secure by Letters Patent is:

1. In wiping and sealing devices for well pipes, a pipe-engaging element, comprising, a generally annular body constructed of flexible resilient material having an axial bore therethrough, said bore having an initial pre-formed diameter somewhat greater than that of a pipe to be extended therethrough, and an annular flexible resilient member circumferentially mounted about the exterior of said body and adapted to resiliently constrict said body circumferentially into compressive engagement with said pipe.

2. In wiping and sealing devices for well pipes, a pipe-engaging element, comprising, a generally annular body constructed of flexible resilient material having an axial bore therethrough, said bore having an initial pre-formed diameter somewhat greater than that of a pipe to be extended therethrough, and a ring-shaped member constructed of flexible resilient material circumferentially mounted about the exterior of said body, said ring-shaped member having an initial pre-formed internal diameter less than the exterior diameter of said body whereby to resiliently constrict said body circumferentially into compressive engagement with said pipe.

3. In wiping and sealing devices for well pipes, a pipe-engaging element, comprising, a generally annular body constructed of flexible resilient material having an annular pipe-engaging portion projecting inwardly of the bore of said body intermediate the ends thereof, the bore of said portion having an initial pre-formed diameter somewhat greater than that of a pipe to be extended therethrough, said portion having an outer surface concentric with said bore, and a ring-shaped member constructed of flexible resilient material circumferentially mounted about said outer surface, said ring-shaped member having an initial pre-formed internal diameter less than that of said outer surface whereby to resiliently constrict said pipe-engaging portion circumferentially into compressive engagement with said pipe.

4. In wiping and sealing devices for well pipes, a pipe-engaging element, comprising, a generally tubular body constructed of flexible rubber and having an axial bore of an initial pre-formed diameter somewhat greater than that of a pipe to be extended therethrough, and a separable flexible rubber ring circumferentially disposed about the exterior of the body and annularly dimensioned with respect thereto to urge said body into circumferential compressive engagement with said pipe.

5. A pipe-engaging element according to claim 4 wherein said body has an annular seating recess in its exterior surface intermediate its ends for receiving said ring.

6. In wiping and sealing devices for well pipes; a pipe-engaging element, comprising, a generally tubular body constructed of flexible rubber and having an axial bore of an initial preformed diameter somewhat greater than that of a pipe to be extended therethrough, and a separable flexible rubber ring circumferentially disposed about the exterior of the body and annularly dimensioned with respect thereto to urge said body into circumferential compressive engagement with said pipe, said body being provided at its upper end with an annular outwardly and downwardly flaring flexible lip for sealing engagement with a tubular surface concentrically spaced from the exterior of said body.

7. In wiping and sealing devices for well pipes, a pipe-engaging element, comprising, a generally tubular body constructed of flexible rubber and having an axial bore of an initial preformed diameter somewhat greater than that of a pipe to be extended therethrough, and a separable flexible rubber ring circumferentially disposed about the exterior of the body and annularly dimensioned with respect thereto to urge said body into circumferential compressive engagement with said pipe, said body being provided at its upper end with an annular outwardly and downwardly flaring flexible lip for sealing engagement with a tubular surface concentrically spaced from the exterior of said body, and a metallic support ring mounted on said lip engageable with said surface.

8. In wiping and sealing devices for well pipes, a pipe-engaging element, comprising, a hollow generally toroidal body constructed of flexible rubber, the innermost wall portion of said body defining an axial bore having an initial pre-formed diameter somewhat greater than that of a pipe to be extended therethrough, and a separable flexible rubber ring mounted inside of the confines of said hollow body and circumferentially disposed about the exterior of said innermost wall portion and annularly dimensioned with respect thereto to urge said wall portion into circumferential compressive engagement with said pipe.

9. A pipe-engaging element according to claim 8 wherein the outer periphery of said body is provided with means for separably connecting said body to a supporting frame.

10. A pipe-engaging element according to claim 8 wherein the outer periphery of said body is provided with a pair of radially extending spaced-apart flanges for separably connecting said body to a supporting frame.

11. A pipe wiper, comprising, a generally oblong frame composed of a relatively flat sheet of flexible material having a circular opening therein, a generally circular pipe-wiping element removably mounted in said opening, said element, comprising, a hollow generally toroidal body constructed of flexible rubber, the innermost wall portion of said body defining an axial bore having an initial pre-formed diameter somewhat greater than that of a pipe to be extended therethrough, a separable flexible rubber ring mounted inside of the confines of said hollow body and circumferentially disposed about the exterior of said innermost wall portion and annularly dimensioned with respect thereto to urge said wall portion into circumferential compressive engagement with said pipe, and means on the outer periphery of said body for separably connecting said body to portions of said frame defining said opening.

12. A pipe wiper according to claim 11, wherein said means comprises a pair of radially extending spaced-apart flanges adapted to receive between them the portions of said frame defining said opening, and means for releasably clamping said flanges to said portions.

References Cited in the file of this patent

UNITED STATES PATENTS

| | | |
|---|---|---|
| 1,988,652 | Gardner | Jan. 22, 1935 |
| 2,052,762 | Gits | Sept. 1, 1936 |
| 2,162,104 | Mosher | June 13, 1939 |
| 2,175,648 | Roach | Oct. 10, 1939 |
| 2,178,699 | Penick et al. | Nov. 7, 1939 |
| 2,233,359 | Rogers | Feb. 25, 1941 |
| 2,252,240 | Tschappat | Aug. 12, 1941 |
| 2,257,119 | Johannesen | Sept. 30, 1941 |
| 2,350,697 | Petch | June 6, 1944 |
| 2,565,923 | Hrdlicka | Aug. 28, 1951 |
| 2,647,774 | Newberry | Aug. 4, 1953 |

FOREIGN PATENTS

| | | |
|---|---|---|
| 344,640 | Great Britain | Mar. 12, 1931 |
| 799,867 | France | Apr. 20, 1936 |